(12) United States Patent
Simpson et al.

(10) Patent No.: US 11,162,923 B2
(45) Date of Patent: Nov. 2, 2021

(54) TWIST LOCK COMPLIANT NEEDLE FOR DETECTION OF CONTACT

(71) Applicant: Waters Technologies Corporation, Milford, MA (US)

(72) Inventors: David A. Simpson, Hopkinton, MA (US); Joshua A. Burnett, Taunton, MA (US); John M. Auclair, Seekonk, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 107 days.

(21) Appl. No.: 16/512,559

(22) Filed: Jul. 16, 2019

(65) Prior Publication Data

US 2020/0025722 A1 Jan. 23, 2020

Related U.S. Application Data

(60) Provisional application No. 62/700,515, filed on Jul. 19, 2018.

(51) Int. Cl.
*G01N 30/16* (2006.01)
*G01N 30/18* (2006.01)
*G01N 30/02* (2006.01)

(52) U.S. Cl.
CPC ............. *G01N 30/18* (2013.01); *G01N 30/16* (2013.01); *G01N 2030/027* (2013.01)

(58) Field of Classification Search
CPC .... G01N 30/18; G01N 2030/027; G01N 1/14; G01N 2001/1418; G01N 2001/1427; G01N 30/04; G01N 30/16; G01N 230/167

USPC ................................ 73/61.55, 864.21–864.25
See application file for complete search history.

(56) References Cited

U.S. PATENT DOCUMENTS

| | | | |
|---|---|---|---|
| 4,713,974 A | 12/1987 | Stone | |
| 6,270,726 B1 * | 8/2001 | Tyberg | G01N 35/1011 422/509 |
| 6,363,802 B1 * | 4/2002 | Grippo | G01N 35/1011 73/864.24 |
| 9,733,221 B2 | 8/2017 | Zimmermann et al. | |
| 2010/0206834 A1 | 8/2010 | Weimin | |
| 2013/0008237 A1 * | 1/2013 | Usowicz | G01N 30/16 73/61.52 |
| 2014/0116159 A1 | 5/2014 | Hans-Peter et al. | |
| 2018/0238775 A1 * | 8/2018 | Kambara | G01N 1/14 |

OTHER PUBLICATIONS

International Search Report and Written Opinion in related international patent application No. PCT/US19/041920, dated Dec. 11, 2019; 19 pages.
Invitation to Pay Additional Fees in International Patent Application No. PCT/US2019/041920, mailed on Oct. 17, 2019; 13 pages.
International Preliminary Report on Patentability in PCT/US2019/041920 dated Jan. 28, 2021.

\* cited by examiner

*Primary Examiner* — Robert R Raevis
(74) *Attorney, Agent, or Firm* — Schmeiser, Olsen & Watts LLP; Jason A. Murphy

(57) ABSTRACT

A twist-lock compliant needle including a housing component surrounding a needle holder holding a rigidly mounted needle, the housing component including a biasing element disposed therein, wherein the biasing element compresses as a needle tip of the needle contacts a surface is provided. An associated method is also provided.

18 Claims, 14 Drawing Sheets

TWIST LOCK COMPLIANT NEEDLE FOR DETECTION OF CONTACT

RELATED APPLICATIONS

This application is a non-provisional patent application claiming priority to U.S. Provisional Patent Application No. 62/700,515, filed Jul. 19, 2018, entitled "Twist Lock Compliant Needle for Detection of Contact," which is incorporated herein by reference.

FIELD OF TECHNOLOGY

The following relates to embodiments of a needle mechanism, and more specifically to embodiments of a needle mechanism for detecting a contact between a needle and a surface in a liquid chromatography system.

BACKGROUND

Liquid chromatography is a technique in analytic chemistry where distinct components of a mixture are identified by separating the individual components by passing the mixture through a stationary phase using fluid flow so that the components elute at different rates. Liquid chromatography systems are typically comprised of a solvent delivery pump, an autosampler, a column, and a detector. The solvent delivery pump pumps mobile phase fluid through the system, the autosampler introduces the sample to be analyzed to the analytic flow path, the column contains the packing material used to effect separation, and the detector detects the separated components as they elute out of the column.

Samples for chromatographic analysis can be stored in sample containers, such as vials and wellplates. Needle mechanisms, coupled to a bearing block having programmable movement, are moved between sample container locations to aspirate sample from the sample containers and then inject the sample into an injection port to the analytic flow path of the liquid chromatography system. Current needle mechanisms include a rigidly mounted needle with compliance in the inject port/seal pack of the autosampler, or sample manager. The rigidly mounted needle and compliance in the inject port/seal pack complicates a design of the inject port and makes maintenance more time consuming and costly. Further, the rigidly mounted needle can be damaged if the needle is driven into a rigid surface, such as a bottom of the sample container, because the system cannot accurately sense that a tip of the needle is in contact with the rigid surface.

Thus, there is a need for a needle mechanism that is compliant and can be used as a contact sensor in high-performance liquid chromatography systems.

SUMMARY

A first general aspect relates to a twist-lock compliant needle comprising: a housing component surrounding a needle holder holding a rigidly mounted needle, the housing component including a biasing element disposed therein, wherein the biasing element compresses as a needle tip of the needle contacts a surface.

In an exemplary embodiment, the housing component is locked into engagement with a carriage of an autosampler of a liquid chromatography system, and the carriage moves relative to the needle to compress the biasing element.

In an exemplary embodiment, at least one sensor captures the movement of the carriage relative to the needle to detect when the needle tip contacts the surface.

In an exemplary embodiment, the housing compartment is configured to be twisted to lock the housing component in place relative to the carriage, and the housing compartment is first depressed, then twisted into a locked position.

A second general aspect relates to a locking needle mechanism comprising: a needle holder configured to retain a needle configured to aspirate sample from a sample container and inject the sample into an injection port of a liquid chromatography system, a carriage configured to move the needle between sample container locations and an injection port of the liquid chromatography system, the carriage including at least one receiving slot and at least one retaining cavity, and a housing component including at least one retaining element protruding from the housing component that passes through the at least one receiving slot as the housing component is received within the carriage, wherein a biasing element is disposed within the housing component, wherein the housing component is locked into place with the carriage when the biasing element is compressed in a first direction so that the housing component moves in the first direction with respect to the carriage, and the housing component is then rotated in a second direction until the at least one retaining element is aligned with the at least one retaining cavity of the carriage.

In an exemplary embodiment, the at least one retaining element of the housing component is retained within the at least one retaining cavity of the carriage to lock the housing component into place with the carriage.

In an exemplary embodiment, the biasing element urges the at least one retaining element of housing component into the at least retaining cavity of the carriage.

In an exemplary embodiment, the needle mechanism further includes a base flange disposed around the needle holder, wherein a bottom surface of a flange portion of the base flange contacts a flange of the needle holder, and a top surface of the flange portion of the base flange contacts the biasing element.

In an exemplary embodiment, the carriage includes an opening for receiving the housing component, the biasing element, and the needle holder.

In an exemplary embodiment, the at least one receiving slot is located proximate the at least one retaining cavity.

In an exemplary embodiment, the housing component is depressed to compress the biasing element, forcing the housing component to move in the first direction at least past a thickness of a top surface of the carriage between the at least one receiving slot and the at least one retaining cavity.

In an exemplary embodiment, the housing component includes a neck portion for gripping the housing component to rotate the housing component in the second direction.

In an exemplary embodiment, the locking needle mechanism is configured to detect a contact between the needle a sample container surface.

In an exemplary embodiment, the locking needle mechanism further includes at least one sensor to detect a movement of the carriage with respect to the needle, when the carriage is locked into place with the housing component.

A third general aspect relates to a needle mechanism for detecting a contact between a needle tip and a surface comprising a needle configured to aspirate sample from a sample container and inject the sample into an injection port of a liquid chromatography system, the needle rigidly mounted to a needle holder, a carriage configured to move the needle between sample container locations and an injection port of the liquid chromatography system, and a housing component locked into place with the carriage, wherein a biasing element is disposed within the housing component, wherein the contact between the needle tip and the surface is detected when the carriage moves with respect to the needle as the needle remains stationary.

In an exemplary embodiment, in response to the detecting of the contact, the carriage is programmed to reverse direction until the needle contact no longer contacts the surface to maximize sample recovery within the sample container.

A fourth general aspect relates to a method for detecting a contact between a needle tip and a surface, the method comprising attaching a needle holder that retains the needle and a housing component that includes a biasing element to a carriage of a sample manager of a liquid chromatography system, wherein the housing component is locked into place with the carriage, detecting a relative movement of the carriage with respect to the needle as the carriage is moved into a sample container, and controlling the carriage to automatically move to a new position, in response to the detecting.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Figure 1:
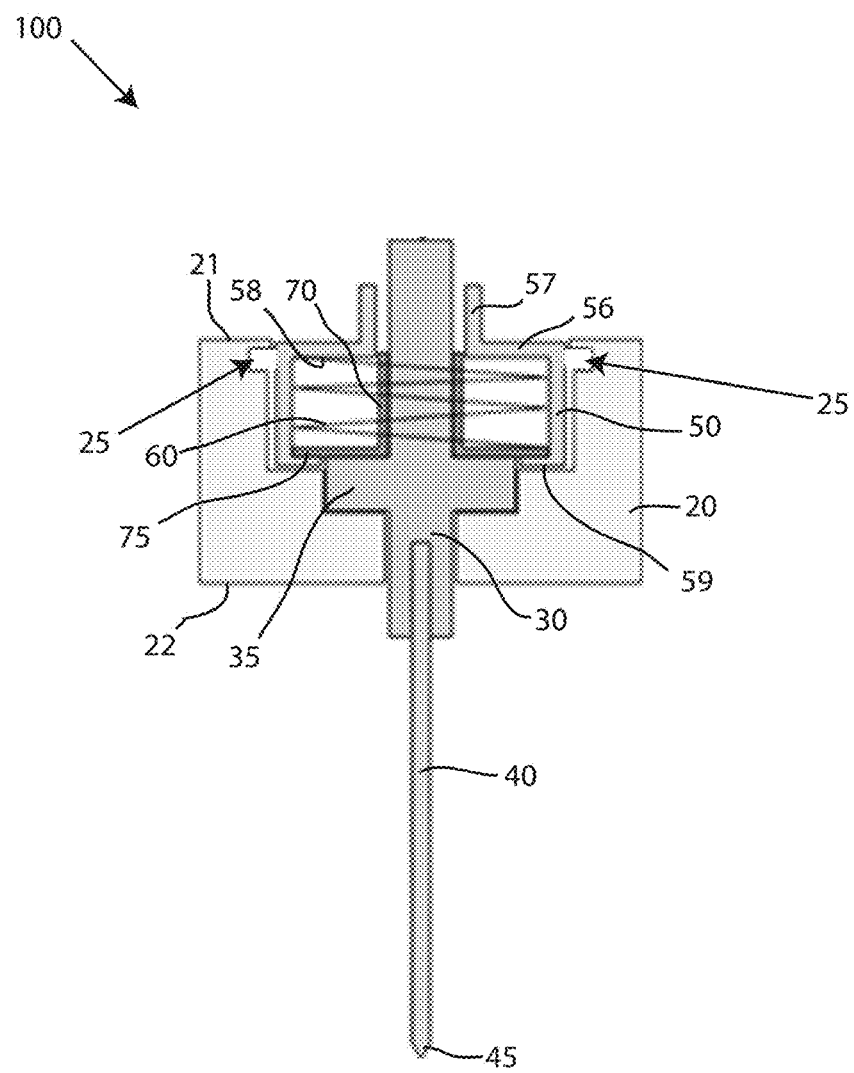
FIG. 1 depicts a schematic, cross-section view of an embodiment of a needle mechanism.

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Existing needle mechanisms for use in autosampler or sample manager modules in a liquid chromatography system typically have the following primary capabilities: moving between sample container locations and the injection port, aspirating sample, and injecting the sample into the analytic flow path of the liquid chromatography system. Further, existing needle mechanisms include a rigidly mounted needle with compliance in the inject port/seal pack, which complicates a design of the inject port and makes maintenance more time consuming and costly. Embodiments of the present invention also relate to a needle mechanism used in autosampler or sample manager module in a liquid chromatography system. However, embodiments of the needle mechanism of the present invention include compliance within the needle mechanism. Compliance within the needle mechanism exposes the components to the user, making is faster for the user to install and service the needle. Additionally, the compliance within the needle mechanism allows the design of the inject port to be simplified and static, thereby improving a reliability of those components. The needle mechanism of the present invention also improves the reliability of the aspirating and injection capabilities, sample recovery, serviceability, manufacturability and reliability of the needle mechanism, and provides for the ability to add error detection into the needle mechanism, and self-contained vial and seal force detection within the needle mechanism.

The needle mechanism incorporates a biasing element (e.g. a spring) into the needle mechanism, which allows the needle mechanism and/or autosampler system to detect and react when the needle contacts a surface, such as a vial, a plate, or a seal. Existing needle mechanisms are unable to detect sample container bottoms, which means the needles rely on the user and encoders or step counting to determine how far to drive the needle into the sample container before aspirating the sample. The addition of the compliance within the needle mechanism removes this inherent uncertainty, improving sample recovery and preventing damage to the needle when the system is incorrectly configured. Finally, the needle mechanism of the present invention also improves the serviceability of the mechanism. Current autosampler systems incorporate compliance in the inject port, which makes it harder to service and install. A compliant needle using a twist-lock design, as described herein, is easier to install than existing needle mechanisms, while enabling the simplification of the inject port design.

Referring to the drawings, FIG. 1 depicts a cross-section view of an embodiment of a needle mechanism 100. The needle mechanism 100 is a component within a liquid chromatography system used to aspirate sample and inject sample into an injection port. In other implementations, the needle mechanism 100 is a component within a fluid control system other than liquid chromatography systems, for aspirating a fluid. The needle mechanism 100 may be referred to as a needle assembly, a compliant needle, a compliant needle mechanism, a twist-lock needle mechanism, a twist-lock needle assembly, a locking needle mechanism, a rotation lock and contact sensing needle mechanism, a contact sensor needle mechanism, and the like. Moreover, the needle mechanism 100 includes a carriage 20, a needle holder 30, a needle 40, a housing component 50, a biasing member 60, and a base flange 70.

The needle mechanism 100 includes a carriage 20. The carriage 20 may be a carriage, a needle carriage, a bearing block, a moveable block, a needle carrying element, and the like. The carriage 20 may be configured to hold, accommodate, or otherwise retain the needle holder 30, the needle 40, the housing component 50, biasing member 60, and the base flange 70, while the carriage 20 is displaced from location to location as part of an autosampler of a liquid chromatography system. For instance, the carriage 20 is moved from sample container locations to an injection port of the liquid chromatograph system. A movement of the carriage 20 may be computer programmable. In other words, the carriage 20 is programmed to move or to be driven between sample locations and the injection port, while supporting/holding the other components of the needle mechanism.

Figure 2:
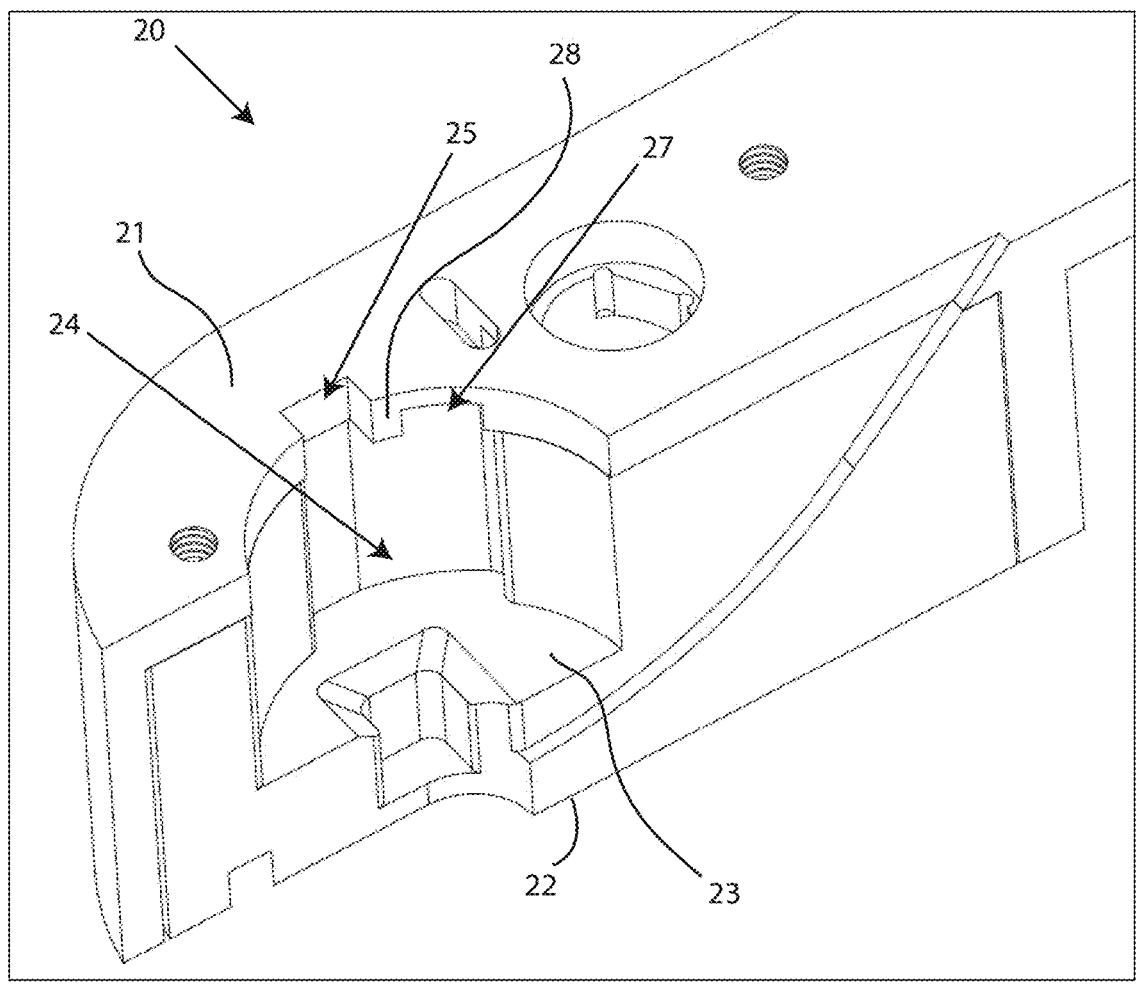
FIG. 2 depicts a cut-away cross-sectional view of an embodiment of a carriage of the needle mechanism.

FIG. 2 depicts a cut-away cross-sectional view of an embodiment of the carriage 20. The carriage 20 includes an opening 24 for receiving the housing component 50, the biasing element 60, and the needle holder 30. The opening 24 may be an opening, a space, a void, a cavity, a region, an internal region, a receiving opening, an accommodation, and the like. The opening 24 receives, accommodates, holds, or otherwise retains components in an operable configuration. The opening 24 is a generally annular opening extending through the carriage 20 from a first end or top surface 21 to a second end or bottom surface 22. The opening 24 is sized and dimensioned to snugly retain the various components. For instance, the opening 24 of the carriage 20 defines one or more lips or surfaces 23 for engaging or supporting the housing component 50 and needle holder 30 in an operable configuration. Moreover, the carriage 20 includes one or more receiving slots 25 proximate the opening 24. The receiving slots 25 may be a groove, a notch, a cavity, a channel, an indentation, cutout, and the like. In an exemplary embodiment, the receiving slots 25 extend from surface 23 proximate a bottom surface 22 of the carriage 20 to the top surface 21. The receiving slots 25 may be configured to receive retaining elements 55 of the housing component 50, described in greater detail infra. The receiving slots 25 are accessible from the top surface 21 of the carriage 20, such that as the housing component 50 is initially inserted into the opening 24 of the carriage 20, the retaining elements 55 can pass through the receiving slots 25. The receiving slots 25 may be generally rectangular in cross-section; however, the cross-section of the receiving slot 25 may correspond to a cross-section of the retaining elements 55 of the housing component 50.

The carriage 20 also includes one or more retaining cavities 27. The retaining cavities 27 may be a notch, cavity, cutout, indentation, groove, detent, and the like. The retaining cavities 27 are located proximate or otherwise near the receiving slots 25. In an exemplary embodiment, the retaining cavities 27 are positioned a circumferential distance from the receiving slot 25, separated by a portion 28 of the carriage 20. The portion 28 is defined by a surface that faces the receiving slot 25 and a surface that faces the retaining cavity 27. Further, the retaining cavity 27 is not open to the top surface 21 of the carriage 20 due to an upper surface that covers the retaining cavity 27 and engages a surface of the retaining elements 55 of the housing component 50, as described in greater detail infra. The retaining cavities 27 may generally have a rectangular cross-section, and may be offset or otherwise have a non-parallel orientation to the receiving slots 25.

Figure 3:
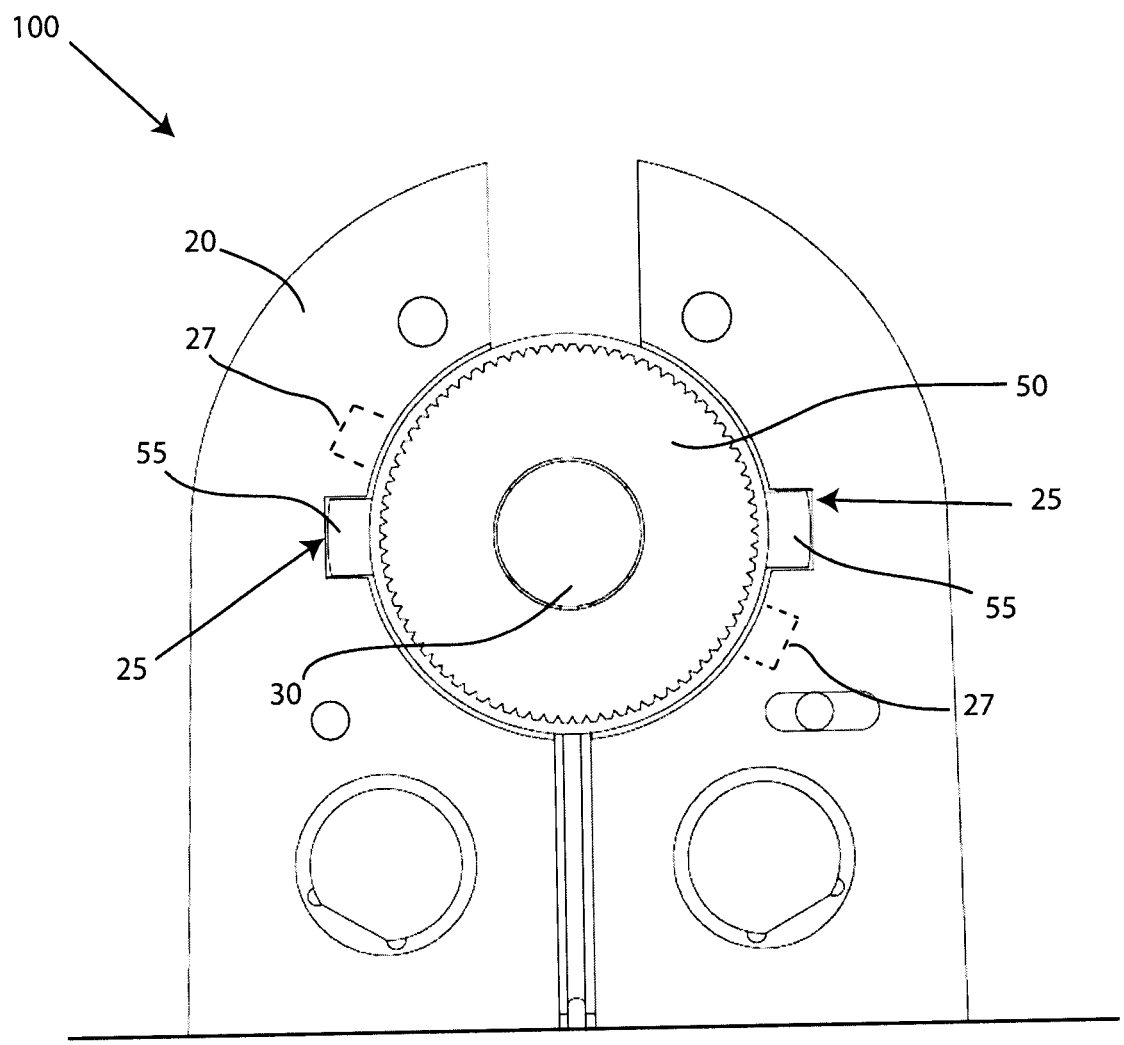
FIG. 3 depicts a top view of an embodiment of the needle mechanism with a cross-cut carriage.

FIG. 3 depicts a top view of an embodiment of the needle mechanism 100. As shown in FIG. 3, the carriage 20 holds, accommodate, receiver, or otherwise retain the needle holder 30 (and the needle 40) and the housing compartment 50. The needle holder 30 and the housing compartment 50 are received within the opening 24 of the carriage 20, such that when the carriage 20 moves from position to position, the remaining components move with the carriage 20. In FIG. 3, the section of the carriage 20 retaining the needle holder 30 and the needle 40 is shown. Moreover, the carriage 20 includes more than one receiving slot 25 and more than one retaining cavity 27. In an exemplary embodiment, the carriage 20 includes two receiving slots 25 and two retaining cavities 27. The two receiving slots 25 are positioned opposite each other, across the general opening 24 of the carriage 20. Likewise, the two retaining cavities 27 (shown in dashed lines because the cavities 27 are not visible from a top view of the carriage 20) are positioned opposite each other, across the general opening 24 of the carriage 20. In other embodiment, the carriage 20 includes two or more receiving slots 25 and two more retaining cavities 27, even if the housing compartment 50 has two or less retaining elements 55. Having multiple slots 25 and cavities 27 may allow for more options during assemble of the needle mechanism 100.

Referring back to FIG. 1, embodiments of the needle mechanism 100 also includes a needle holder 30. The needle holder 30 may be configured to hold, retain, secure, or otherwise grip the needle 40. The needle holder 30 holds a rigidly mounted needle in an operable configuration of the needle mechanism 100. Moreover, the needle holder 30 is a generally cylindrical component having a first end (e.g. top end) and a second end (e.g. bottom end). The needle holder 30 includes an annular flange 35 that radially outwardly protrudes from a main body portion of the needle holder 30. The flange 35 engages a surface of the carriage 20 in an operable configuration of the needle mechanism 100. For instance, the needle holder 30 passes through the general opening 24 of the carriage 20 until the flange 35 engages or otherwise contacts a mating surface of the carriage 20. In one implementation, a part of the second end (e.g. bottom end) of the needle holder 30 extends beyond the bottom surface 22 of the carriage 20, while a part of the first end (e.g. top end) of the needle holder 20 extends beyond a top surface 21 of the carriage 20.

The needle mechanism 100 also includes a needle 40. The needle 40 is mounted to or otherwise held by the needle holder 30, proximate or otherwise near the second end of the needle holder 30. In an exemplary embodiment, the needle 40 is rigidly mounted to the needle holder 40. The needle holder 30 is comprised of a plastic material, while the needle 40 is comprised of a metal; the plastic material of the needle holder 30 may be molded over the metal needle 40 so that the two components can be integral with each other. Moreover, the needle 40 may be a needle, a sample needle, an injection needle, a textured needle, a liquid chromatography needle, an autosampler needle, an injector, a sample injector, and the like. The needle 40 includes a first end, a second end, and a needle body. An overall length of the needle 40 may vary depending on the application, a size of a sample compartment of an autosampler, a volume of sample to be analyzed, etc. The needle 40 may be comprised of metal, metal alloy, metal alloys, or a combination thereof. In an exemplary embodiment, the needle 100 is comprised of stainless steel or a chromium alloy, such as MP35N®. Further, the needle 40 includes a needle tip 45. The needle tip 45 includes an orifice for aspirating sample from sample containers and injecting sample into the analytic flow path.

Figure 4:
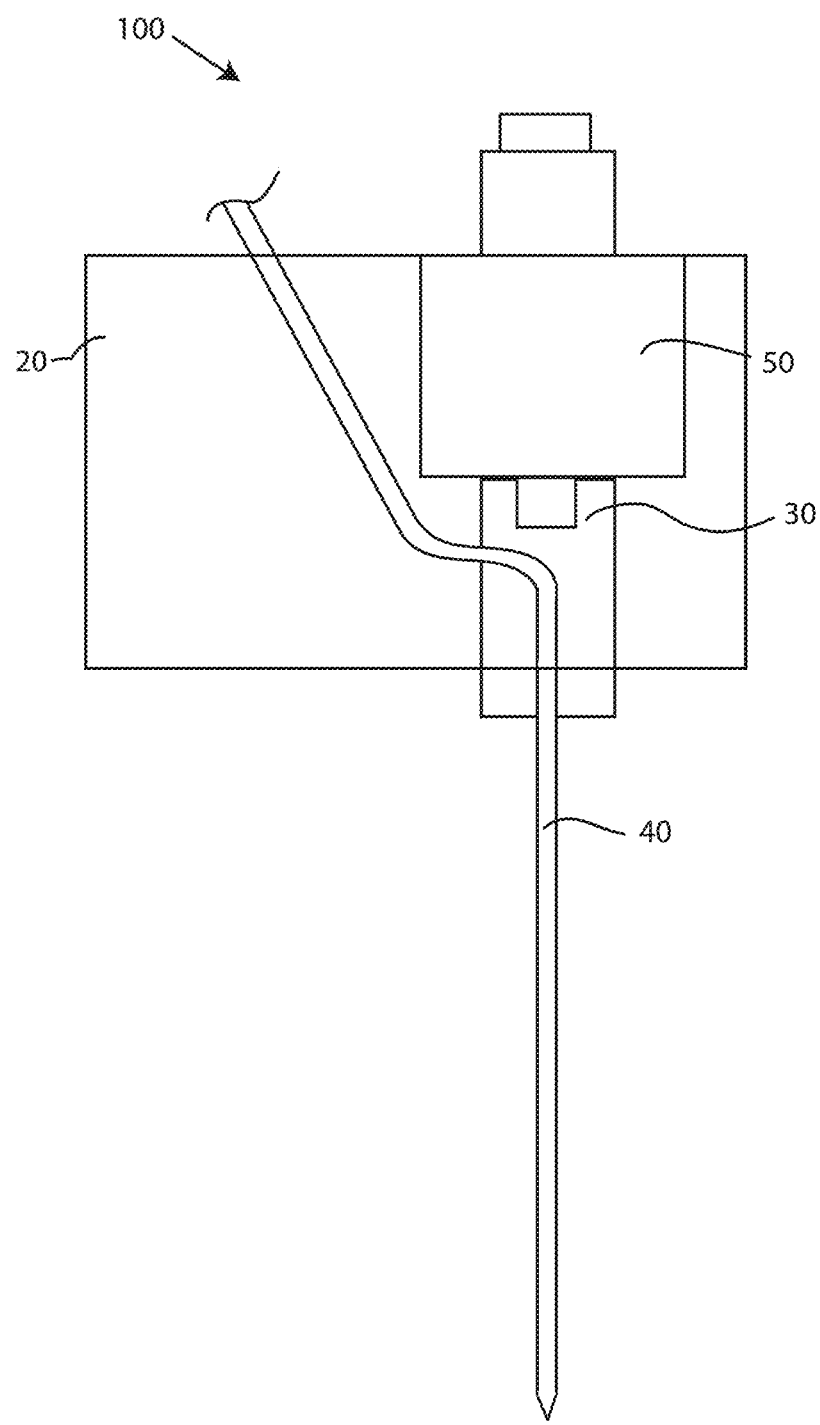
FIG. 4 depicts a schematic view of an embodiment of the needle assembly showing a needle position.

FIG. 4 depicts a schematic view of an embodiment of the needle mechanism 100 showing the needle position. The needle 40 is connected to the needle holder as part of a welded assembly. The needle 40 includes a bent or curved portion and then a straight portion that passes beneath the housing component 50 and then through a slot or guided channel within the carriage 20. In this implementation, the needle 40 is rigidly connected to the needle holder 30, and is also moved out of the way of the housing component 50 which provides convenient access to the housing component 50 for locking the housing component 50 to the carriage 20.

Referring still to FIG. 1, the needle mechanism 100 also includes a housing component 50. The housing component 50 may be a housing, a housing element, a spring housing, a spring retaining element, and the like. The housing component 50 is a generally annular member having a generally axial opening extending therethrough. The housing component 50 includes a lip 56, which may be a recessed portion of the housing component 50 defining a reduction in the internal diameter of the housing component 30. The lip 56 is an annular lip or shoulder that has an interior surface 58 facing an interior of the housing component 30 that is perpendicular or substantially perpendicular to a central axis of the housing component 50. The housing component 50 includes include a neck portion 57 extending or otherwise protruding from the lip 56. The neck portion 57 can have a threaded, knurled, or otherwise textured surface to enhance a gripping/twisting of the housing component 50. On an opposing end of the component housing 50 that includes the lip 56, the component housing 50 includes a protrusion 59. The protrusion 59 may be a lip, an annular lip, an inwardly radially extending protrusion, an annular protrusion, edge, engagement surface, and the like. The protrusion 59 radially inwardly extends towards a central axis of the component housing 50 to define an engagement surface on both sides of the protrusion 59. For instance, a first side of the protrusion 59 engages or otherwise contacts a surface (e.g. lip 23) of the carriage 20 in an operable configuration of the needle mechanism 100. A second, opposing side of the protrusion 59 engages the biasing element 60 or potentially a flange portion 75 of the base flange 70. Further, the housing component 50 is received within the general opening 24 of the carriage 20.

Figure 5:
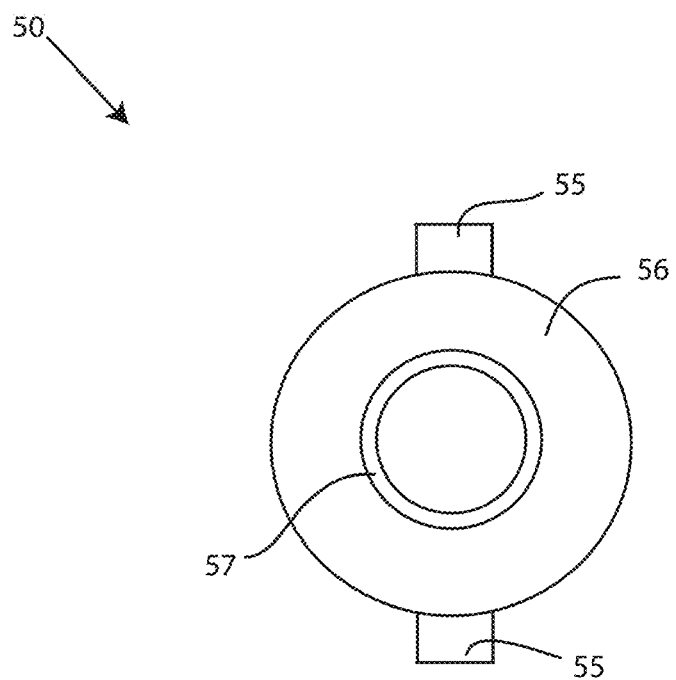
FIG. 5 depicts a top view of an embodiment of a housing component of the needle mechanism.

FIG. 5 depicts a top view of an embodiment of a housing component 50 of the needle mechanism 100. The housing component 50 includes include one or more retaining elements 55. The retaining elements 55 may be tabs, protrusions, plates, wings, extensions, and the like, which extend or protrude from the external surface of the housing component 50. The retaining elements 55 may be configured to be received within the receiving slots 25 of the carriage during assembly, and received within the retaining cavities 27 of the carriage in a locked state of the needle mechanism 100. The retaining elements 55 are be sized and dimensioned to correspond to the receiving slots 25 and the retaining cavities 27 of the carriage 20, and have a corresponding cross-section (e.g. rectangular cross-section). In one implementation, the retaining elements 55 may be structurally integral with the main body of the housing component 50. In another implementation, the retaining elements 55 are attached or otherwise fastened to the main body of the housing component 50. The retaining elements 55 are positioned proximate or otherwise near a top end of the housing component 50; for example, proximate the lip 56 of the housing component 50.

Referring back to FIG. 1, embodiments of the needle mechanism 100 also includes a biasing element 60. Embodiments of the biasing element 60 may be a biasing element, a biasing member, a spring, such as a coil spring, helical spring, or other spring that can exert an opposing force (e.g. biasing force) in response to compressive force acting on the spring. The biasing element 60 is disposed within the needle mechanism 100 to allow the compliance to be located within the needle mechanism 100. In one implementation, the biasing element 60 is disposed within the or generally within the housing component 50. The biasing element 60 is be placed over/around the needle holder 30 and inside the housing component 50. In an operable, assembled configuration, a first end of the biasing element 60 contacts or otherwise engages surface 58 of the housing component 50, and a second end of the biasing element 60 contacts or otherwise engages an inner surface of the protrusion 59. In one implementation, a base flange 70 having a flange portion 75 is positioned within the housing component 50 and surrounds a portion of the needle holder 30. In this implementation, a second end of the biasing element 60 contacts or otherwise engages the flange portion 75 of the base flange 70. The other side of the flange portion 75 contacts or otherwise engages the protrusion 59 and/or a surface of the carriage 20.

Furthermore, the needle mechanism 100 includes a locking feature, wherein the housing component 50 locks into place with respect to the carriage 20. For instance, the housing component 50 can be securely retained with respect to the carriage 20 by compression of the biasing element 60 coupled with a twisting operation. FIGS. 6-10 depict a locking sequence of the needle mechanism 100, in accordance with embodiments of the present invention.

Figure 6:
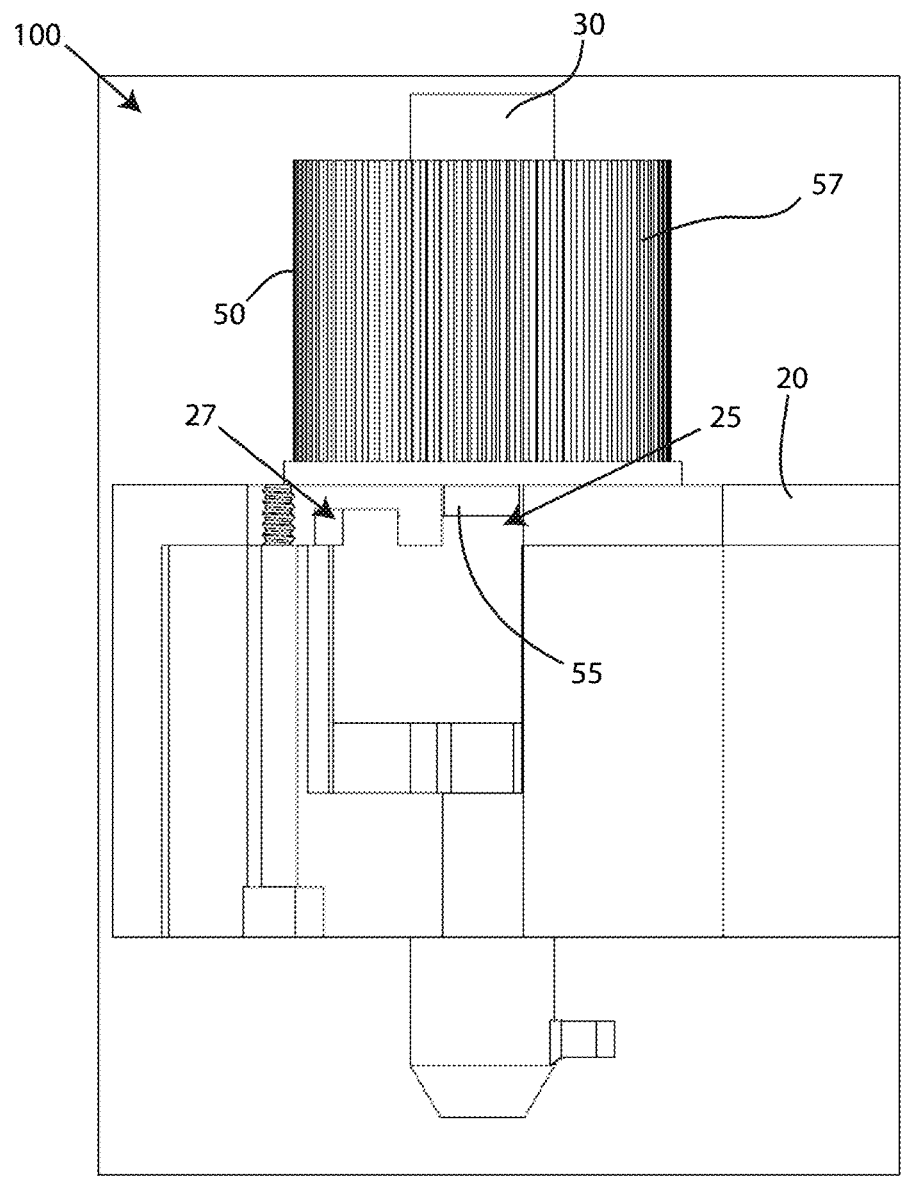
FIG. 6 depicts an embodiment of the needle mechanism at a first stage of assembly of the needle mechanism into a locked state.

FIG. 6 depicts an embodiment of the needle mechanism 100 at a first stage of assembly of the needle mechanism 100 into a locked state. The retaining element 55 of the housing component 50 fits into the receiving slot 25 as the component housing 50 is inserted into the opening 24 of the carriage 20. For example, a user assembling the needle mechanism 100 may manually insert the housing component 50 into the opening 24 of the carriage 20, and eventually align the retaining element(s) 55 with the receiving slot(s) 25 of the carriage 20.

Figure 7:
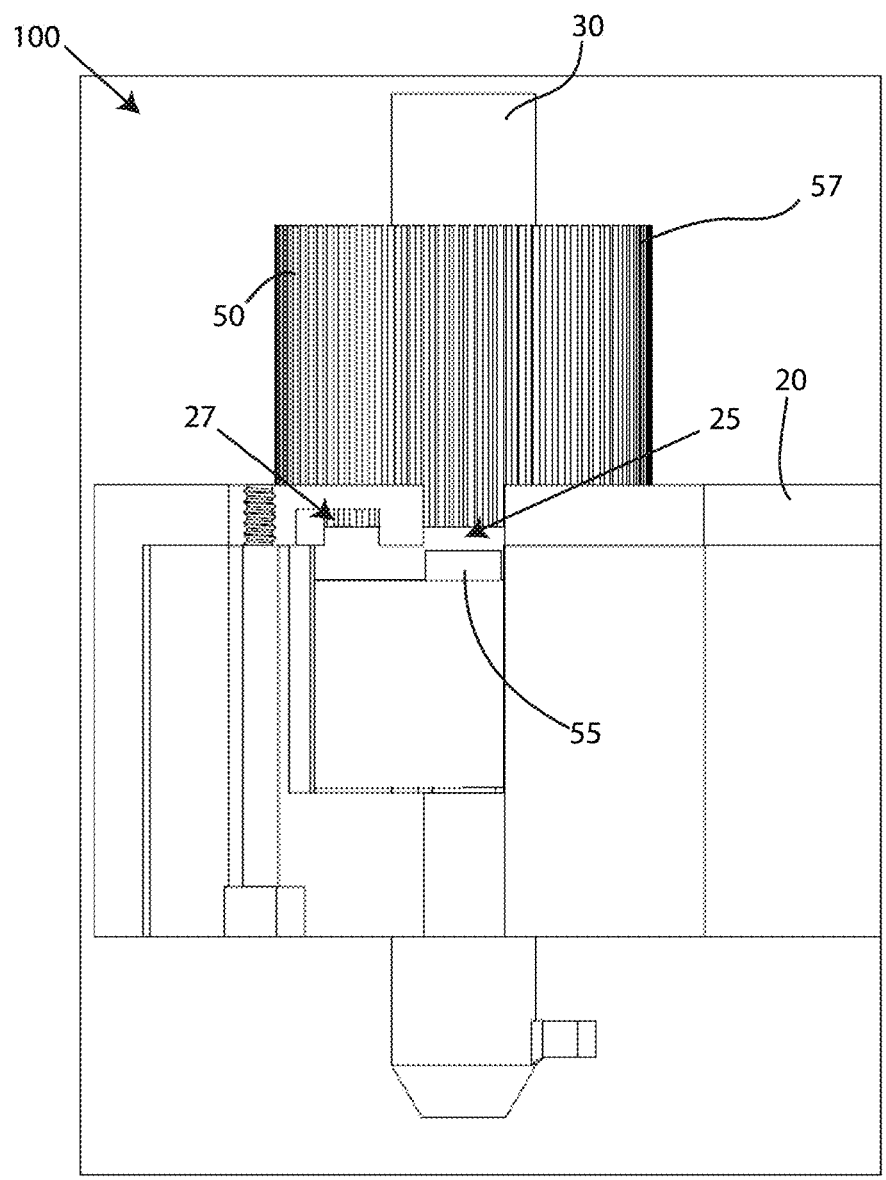
FIG. 7 depicts a cross-sectional view of an embodiment of the needle mechanism at a second stage of assembly of the needle mechanism into a locked state.

FIG. 7 depicts an embodiment of the needle mechanism 100 at a second stage of assembly of the needle mechanism 100 into a locked state. After inserting the component housing 50 and the biasing element 60 over the needle holder 30 and into the opening 24 of the carriage 20 as shown in FIG. 6, the user may depress or otherwise press down on the housing component 50 to compress the biasing element 60. By depressing or pushing down on the housing component 50 (e.g. in particular the neck portion 57 of the housing component 57), the surface 58 of the lip 56 of the housing component 50 engages the first end of the biasing element 60 and compresses the biasing element 60 between the surface 58 and the protrusion 59 and/or flange portion 75 of the base flange 70. Due to the compliance of the biasing element 60, the retaining element 55 of the housing component 50 is lowered to a point beyond the portion 28 of the carriage 20, and a rotation of the housing component 50 is now be permitted. Rotation and/or twisting of the housing component 50 is prevented by the side of the receiving slot 25, prior to the compression of the biasing element 60.

Figure 8:
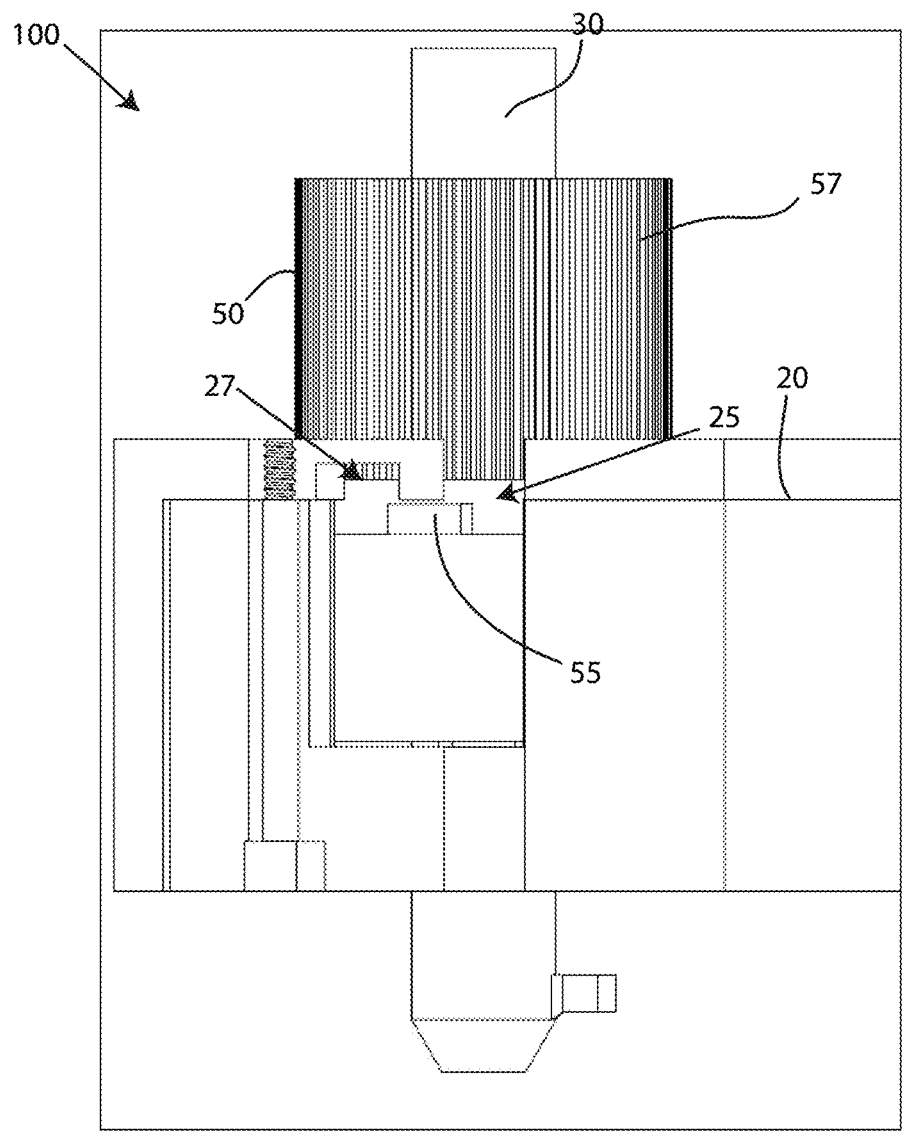
FIG. 8 depicts a cross-sectional view of an embodiment of the needle mechanism at a third stage of assembly of the needle mechanism into the locked state.

FIG. 8 depicts an embodiment of the needle mechanism 100 at a third stage of assembly of the needle mechanism 100 into a locked state. After the housing component 50 is depressed, or the biasing element 60 is compressed, a sufficient distance so that the retaining element 55 clears the carriage portion 28, the housing component 50 (e.g. the neck portion 57) can be rotated or twisted to rotate the housing component 50 with respect to the carriage 20, toward the retaining cavity 27. In other words, the user, after pushing down on the housing component 50 with a sufficient force to cause the biasing element 60 to compress and allow the retaining element 55 to clear carriage portion 28, may twist or rotate the housing component 50 in a clockwise or counterclockwise direction to pass the retaining element 55 underneath portion 28 and the top surface 21 of the carriage 20. As the housing component 50 is twisted, the biasing element 60 continuously biases or otherwise urges the housing component 50 in a direction towards the top surface 21 of the carriage block.

Figure 9:
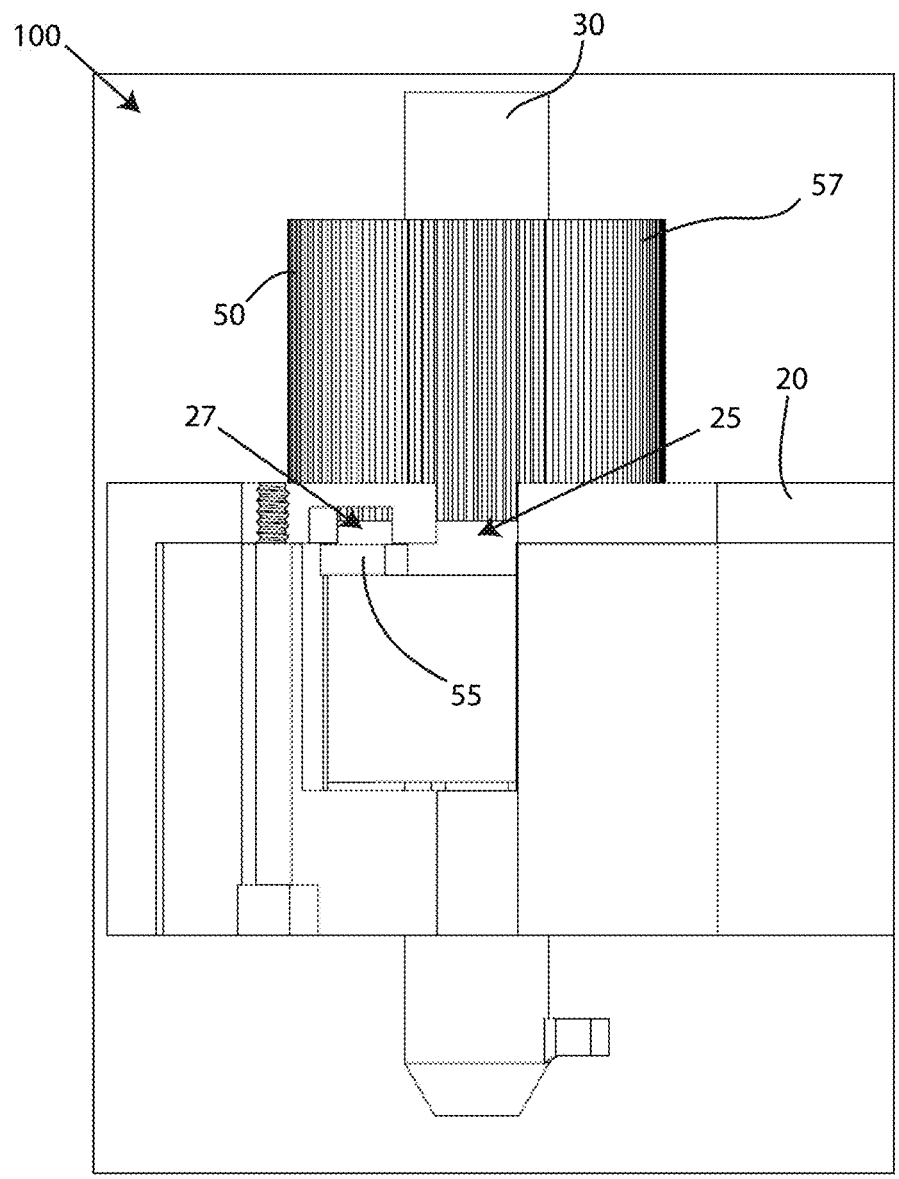
FIG. 9 depicts a cross-sectional view of an embodiment of the needle mechanism at a fourth stage of assembly of the needle mechanism into the locked state.

FIG. 9 depicts an embodiment of the needle mechanism 100 at a fourth stage of assembly of the needle mechanism 100 into the locked state. The housing component 50 may be freely twisted or rotated with respect to the carriage 50, with the purpose of fitting the retaining element 55 into the retaining cavity 27 of the carriage 20. For example, the housing component 50 may be twisted until the retaining elements 55 are aligned with the retaining cavity 27. Because the biasing element 60 continuously provides an opposing, biasing force urging the housing component 50 upwards, the user may detect that the retaining elements 55 are aligned with the retaining cavities 27 when the biasing force of the biasing element 60 begins to force the retaining element 55 into the cavities 27 of the carriage 20.

Figure 10:
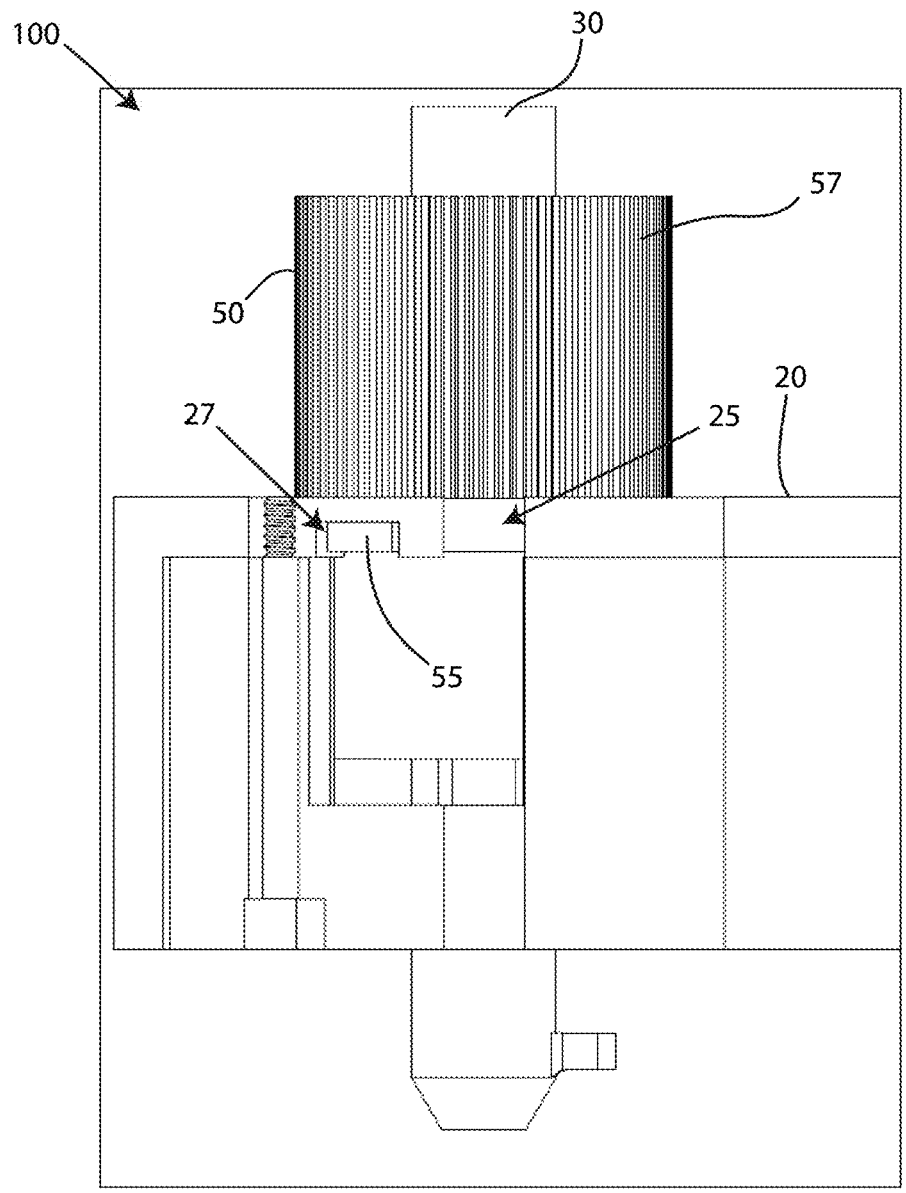
FIG. 10 depicts a cross-sectional view of an embodiment of the needle mechanism at a final stage of assembly of the needle mechanism into the locked state.

FIG. 10 depicts an embodiment of the needle mechanism 100 at a final stage of assembly of the needle mechanism 100 into a locked state. In the final, locked state, the retaining element(s) 55 of the housing component 50 are received within the retaining cavity(s) 27 of the carriage. The housing component 50 is prevented from being rotated with respect to the carriage 20 because of the engagement or potential engagement between the sides of the retaining element 55 and the sides/walls of the retaining cavity 27. Additionally, the housing component 50 is prevented from upwards movement to dislodge from the carriage 20 due to the upper wall of the cavity 27. In the position shown in FIG. 10, the housing component 50 is locked into place with the carriage 20.

Figure 11:
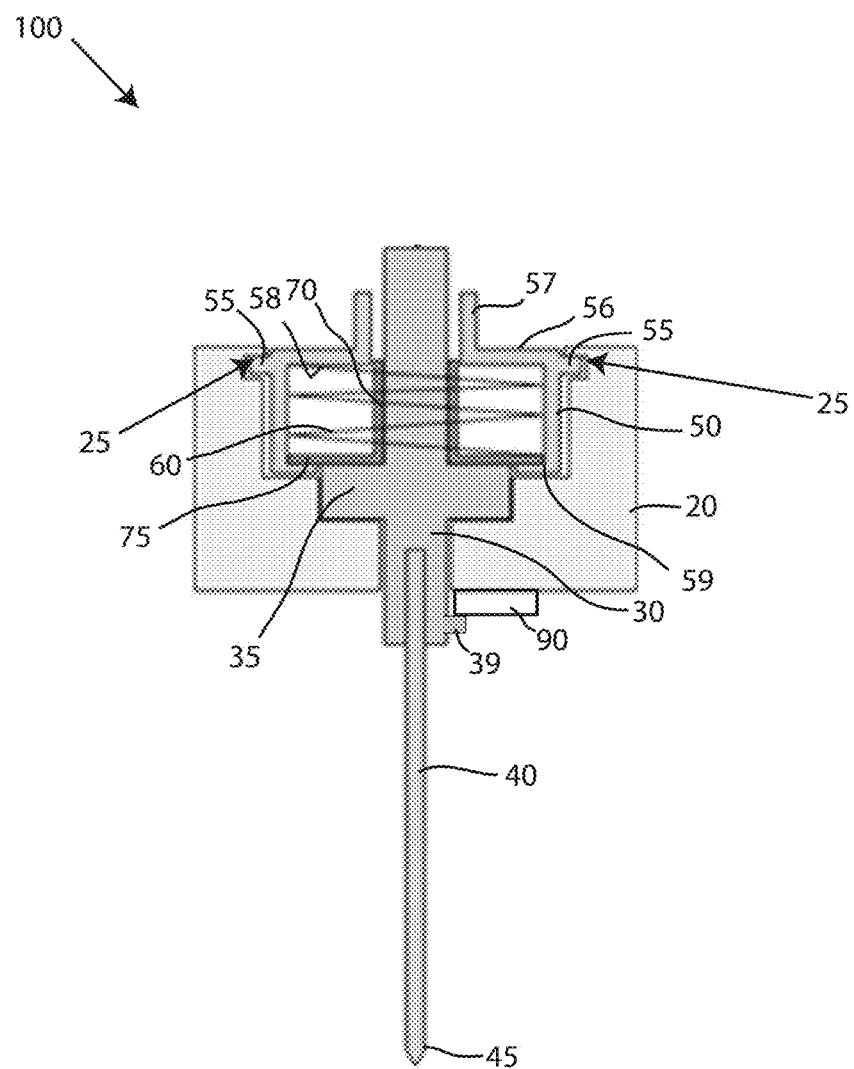
FIG. 11 depicts a schematic, cross-sectional view of an embodiment of the needle mechanism in the locked state.
Figure 12:
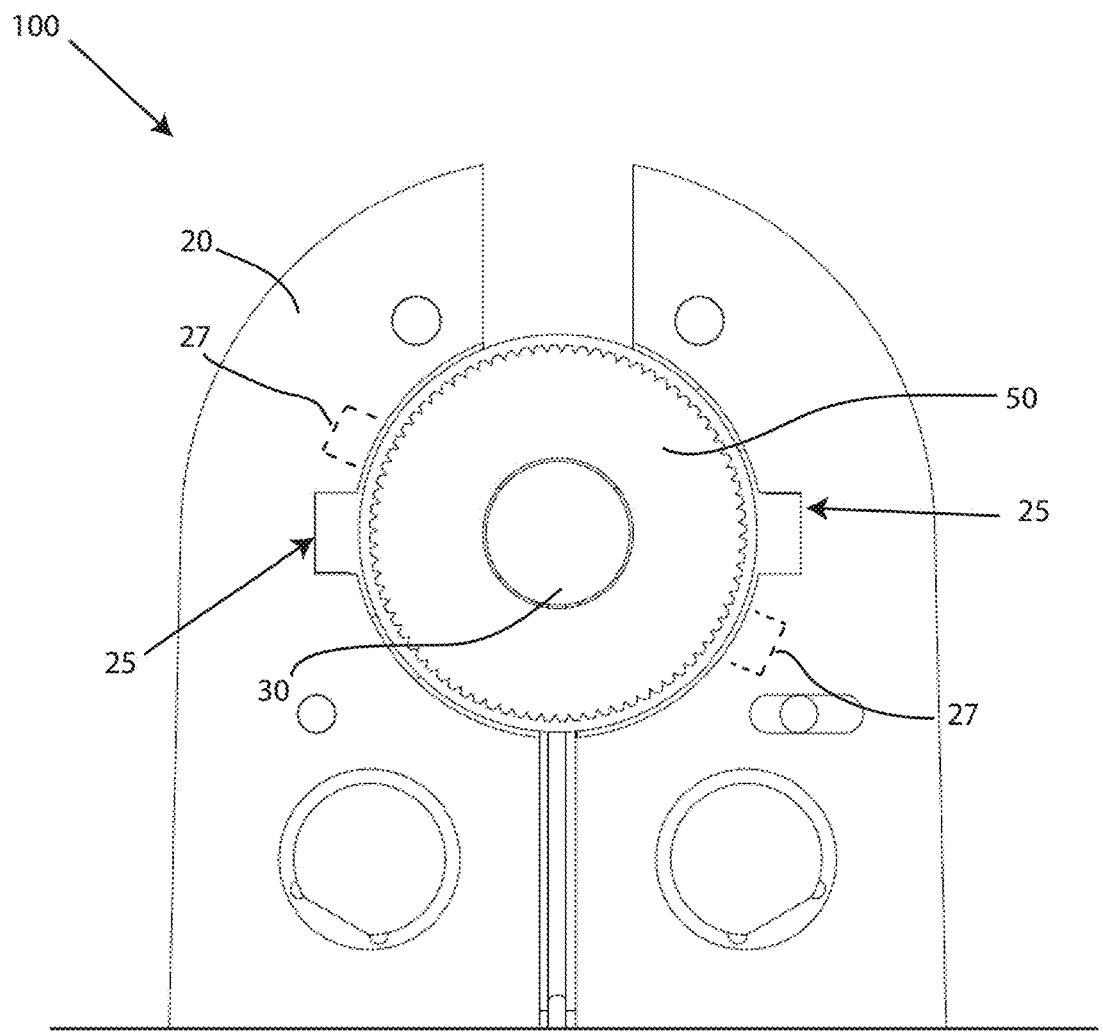
FIG. 12 depicts a top view of an embodiment of the needle assembly in a locked state.

FIG. 11 depicts a schematic, cross-sectional view of an embodiment of the needle mechanism 100 in the locked state. As shown in FIG. 10, the retaining elements 55 of the housing component 50 are received within the retaining cavities 27 of the carriage 20. In this position, the biasing element 60 is at a state of rest, wherein no compression of the biasing element 60 is occurring. However, the biasing element 60 may be slightly compressed in the locked position to provide a biasing force against the surface 58 of the housing component 50 to urge the retaining elements 55 into the cavities 27. The biasing force against the surface 58 also provides a pre-load on the needle 40 so the needle 40 will only move after a known force has been applied. FIG. 12 depicts a top view of the needle assembly in a locked state, in accordance with embodiments of the present invention. In the locked state, the retaining elements 55 are hidden by the upper surface of the retaining cavities.

In the locked position of the needle mechanism 100 shown in FIG. 11, the housing component 50 and the carriage 20 are locked into place with respect to each other. As the carriage 20 moves the needle mechanism 100 into a sample container, for example, the needle tip 45 of the needle 40 rigidly mounted to the needle holder 30 contacts a surface (e.g. bottom of a sample container) that can be rigid enough to stop a movement of the needle 40 and the needle holder 30. When the needle tip 45 is contacting the surface, the needle 40 and the needle holder 30 remain stationary. Due to the compliance of the needle mechanism 100, the carriage 20 and the component housing 50 continue to move towards the surface, relative to the needle 40. For instance, the programmed movement of the carriage 20 may result in the carriage continuing to move toward the sample container, even though the needle tip 45 has contacted the bottom surface of the sample container. The continued movement of the carriage 20 drives the housing component 50 along with carriage 20 because the two components are locked into place together. The carriage 20 driving the housing component 50 causes the biasing element 60 to compress, allowing a movement of the carriage 20 and the housing component 50 relative to the stationary needle 40. The relative movement of the carriage 20 with respect to the needle 40 and/or needle holder 40 may be detected to determine/sense that the needle tip 45 has contacted a surface, such as a rigid surface of the sample container bottom. The sensed contact between the needle tip 45 and the surface (e.g. seal, sample container bottom, injection port) is utilized to take a corrective action. A corrective action that may be taken in response to detecting of the contact includes programming or instructing the carriage to reverse direction until the needle tip 45 contact no longer contacts the surface. The reverse movement of the carriage may be very small, just enough to back the needle tip 45 from the bottom surface of the sample container. In this position, as close to the bottom surface of the sample container without contacting the bottom surface maximizes sample recovery within the sample container.

In an exemplary embodiment, as the carriage 20 moves down to aspirate or inject a sample, the needle 40 travels with the carriage 20. However, as soon as the needle tip 45 contacts a rigid body (e.g. bottom surface of sample container) and the biasing force (e.g. pre-load) of the biasing element 60 in the locked position is overcome, the needle tip 45 will stop as the carriage 20 continues moving down. It is this interaction that allows the needle mechanism 100 to determine when the system has contacted the bottom of a sample container. This relative movement between the needle holder 30 and the carriage 20 can be detected with sensors. The system can be programmed to react in different ways depending on which step of the injection process is in when the contact is detected. For instance, the firmware of the autosampler knows that the carriage 20 is moving into a vial within expected range of bottom, and thus may slightly reverse the carriage 20 until the needle tip 45 is not in contact to maximize sample recovery. In another implementation, the firmware of the autosampler knows that the carriage 20 is moving into a vial and if the needle tip 45 does not contact the bottom surface when the carriage 20 is in an expected range of bottom (e.g. vial is not in expected location), an error message can be generated, avoiding potential damage to the needle 40. In another implementation, the firmware of the autosampler knows that the carriage is moving towards a seal, and when contact is detected, the carriage 20 can be commanded to move a predetermined distance based off of the spring preload and spring rate of the biasing element 60, to reach the desired sealing force of the seal.

Accordingly, the needle mechanism 100 is a twist-lock compliant needle mechanism for use with autosamplers of a liquid chromatography system, that provides several advantages over existing needle mechanisms. The contact detection that the needle mechanism 100 enables a way to detect when the bottom of a sample container is contacted, which allows the system to drive as close to the bottom of a sample container without risk of damaging the needle, thereby improving sample recovery. The contact detection that the needle mechanism 100 also enables a way to detect when an unexpected object is detected. For example, if the system has an error or a user installs an incorrect plate, as the carriage 20 moves down, the needle contact sensor could be monitored. If the needle contacts an object much earlier than expected, the system could throw an error and abort before damaging any components. The contact detection that the needle mechanism 100 also enables a way to detect when a sufficient sealing force is applied. The compliance in the needle mechanism 100 simplifies an ability for a system to be upgraded to multiple pressure ranges.

Referring still to FIG. 11, the relative movement of the carriage 20 with respect to the needle holder 30 and/or needle 40 may be detected by one or more sensors 90. The one or more sensors 90 may be an optical interrupter switch. In one implementation, the sensor 90 includes an internal gap or channel that is configured to receive a portion of the needle holder 30. For instance, as the carriage 20 moves with respect to the needle holder 30 and/or needle 40, the tab 39 of the needle holder 30 breaks a beam of light passing between a light source and a light detector of the sensor 90 (e.g. an optical interrupter switch). The break in the light causes the sensor 90 to trip, sending a signal to the autosampler computer, which determines that the needle tip 45 has contacted a rigid surface, based on the relevant movement between the carriage block 20 and the needle holder 30.

With reference now to FIG. 12 which depicts a schematic fluidic diagram of an embodiment of an autosampler 200 of a liquid chromatography system, having a needle mechanism 100 of FIGS. 1-11, in accordance with embodiments of the present invention. The fluidic diagram shown in FIG. 12 is a flow through needle design; however, the needle mechanism 100 can be used in other liquid chromatography designs, such as a fixed loop system. The needle mechanism 100 can be used to aspirate sample 5 from a sample source 7 for injection into an analytic flow path and eventually to a column for chromatographic analysis. The position shown in FIG. 12 is an aspirate position of the needle mechanism 100. The autosampler 200 (e.g. sample manager) includes a sample compartment 80 and an injection valve 81, as well as other features and components of an autosampler for liquid chromatography applications. The injection valve 81 injects the sample 5 into an analytic flow path of the liquid chromatography system to a column for chromatographic analysis. The sample compartment 80 is configured to receive at least one sample source 7 having a seal 8. For example, the sample compartment 80 houses, receives, or otherwise cooperates with an array of wellplates containing sample 5. Components of autosampler 200, such as a process sample manager, automatically programmatically obtains sample 5 from the sample sources 7, for ultimately injecting into the column via the injection valve 81.

In one implementation, the needle mechanism 100 is a part of the sample compartment 80 for cooperating with the sample source containers 7. For instance, the needle mechanism 100 is housed within the sample compartment 80 of the autosampler 200 for liquid chromatography processes. Moreover, a needle 40 of the needle mechanism 100 is fluidically connected to the injection valve 81, wherein the needle 40 is configured to aspirate the sample 5 from the at least one sample source 7 by piercing the seal 8 of the at least one sample source 7, and then inject the sample 5 into the analytic flow path of a liquid chromatography system.

Figure 13:
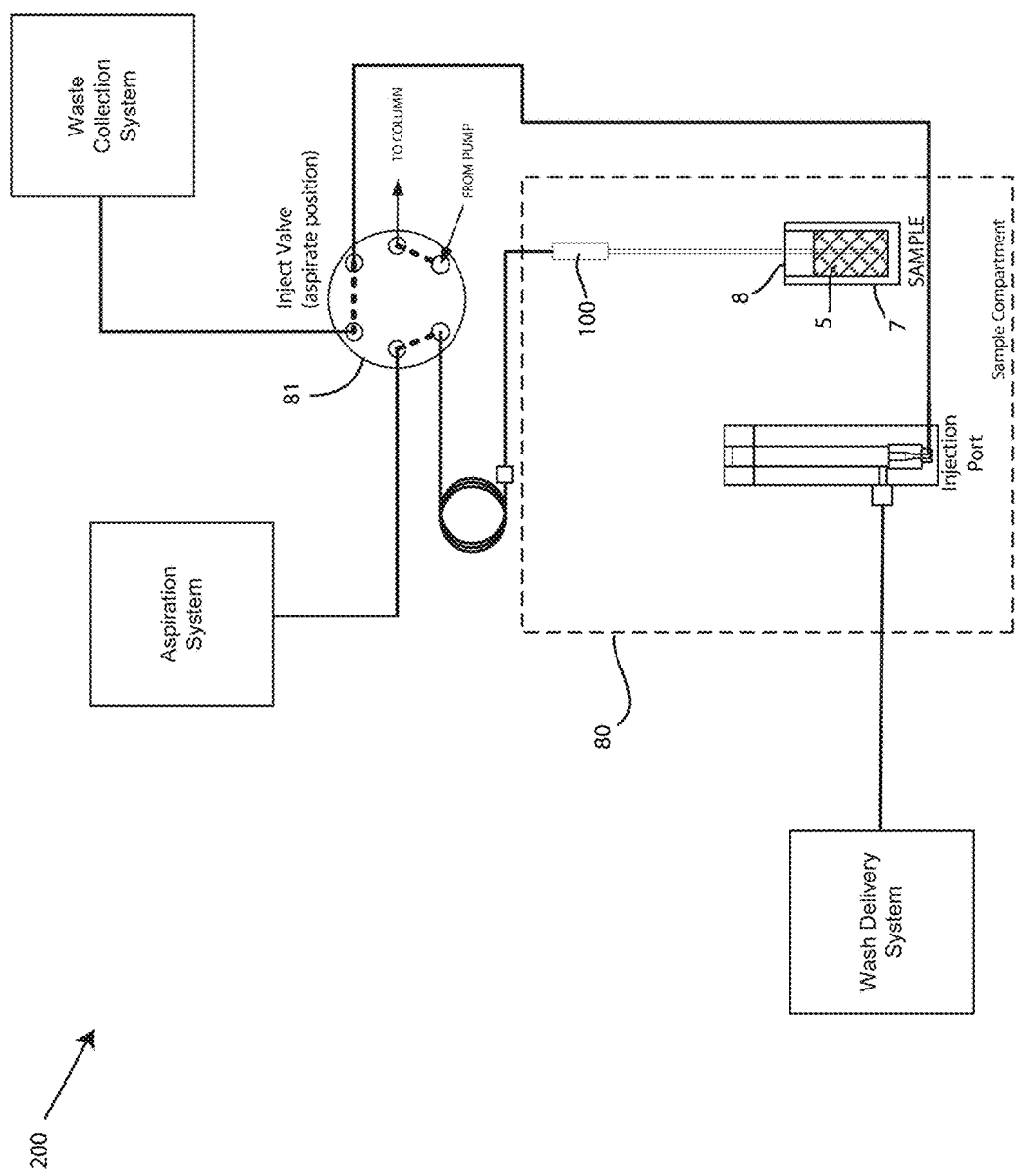
FIG. 13 depicts a schematic fluidic diagram of an embodiment of an autosampler of a liquid chromatography system, having a needle mechanism of FIGS. 1-10.
Figure 14:
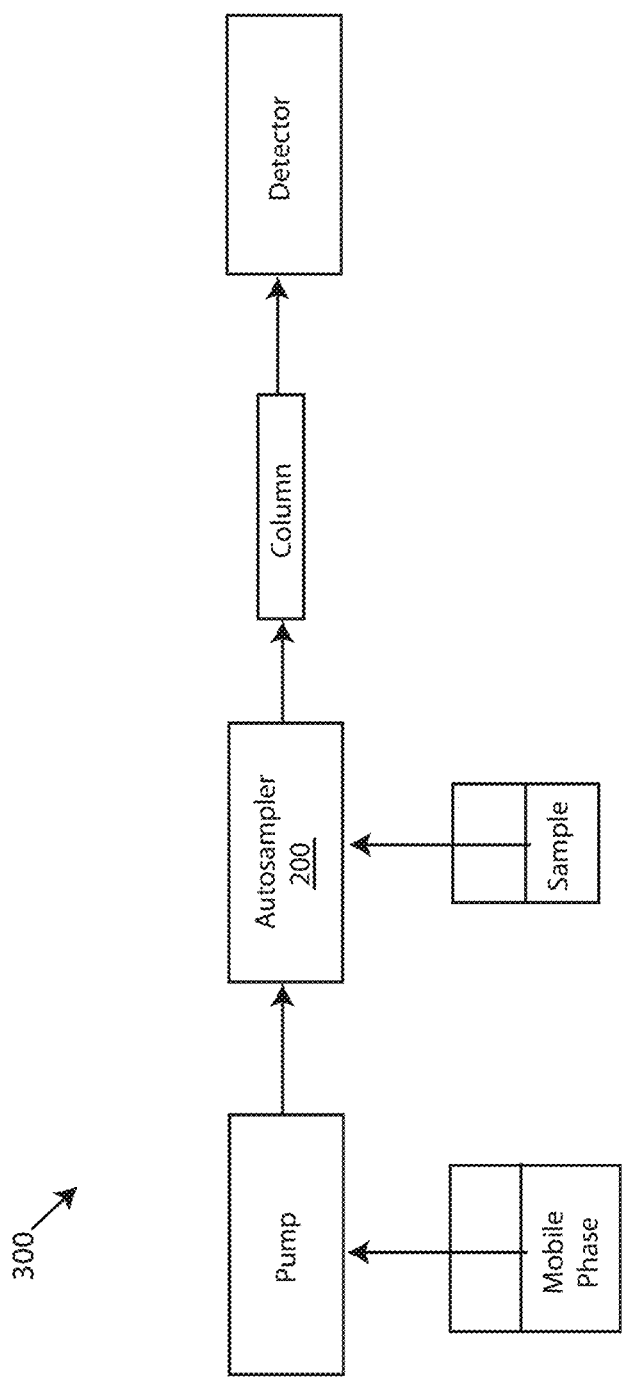
FIG. 14 depicts a schematic diagram of an embodiment of a liquid chromatography system.

FIG. 13 depicts a schematic diagram of an embodiment of a liquid chromatography system 300, in accordance with embodiments of the present invention. The liquid chromatography system 300 includes a mobile phase, such as a solvent reservoir/source, one or more pumps, the autosampler 200 in fluid communication with the sample, a column, and a detector, as known to those skilled in the art of liquid chromatography.

Referring now to FIGS. 1-13, a method for positioning a needle into an optimal aspirating position within a sample container includes detecting a relative movement of a carriage with respect to a needle as the carriage is moved into the sample container, the relative movement confirming a contact between the needle and a bottom surface of the sample container, and controlling the carriage to automatically reposition the needle a new position within the sample container, in response to the detecting. In one implementation, the needle holder 30 that retains the needle 40, the housing component 50 that surrounds the biasing element 60 is attached to the carriage 20 of a sample manager 200 of a liquid chromatography system 300, wherein the housing component 50 is locked into place with the carriage 20. The detecting is accomplished by at least one sensor. The new position may be a distance from a bottom of the sample container, in a reverse direction to maximize sample recovery.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A twist-lock compliant needle mechanism comprising:
   a needle holder holding a rigidly mounted needle;
   a housing component surrounding the needle holder;
   a biasing element disposed within the housing component;
   wherein, when the needle contacts a surface, the housing component moves relative to the needle holder and compresses the biasing element;
   wherein the housing component is locked into engagement with a carriage of an autosampler of a liquid chromatography system.

2. The twist-lock compliant needle of claim 1, wherein the housing component is configured to be twisted to lock the housing component in place relative to the carriage.

3. The twist-lock compliant needle of claim 2, further comprising at least one sensor configured to capture a movement of the carriage relative to the needle to detect when the needle tip contacts a surface.

4. The twist-lock compliant needle of claim 1, wherein the housing component is configured to be depressed and twisted into a locked position.

5. A locking needle mechanism comprising:
- a needle holder configured to retain a needle configured to aspirate sample from a sample container and inject the sample into an injection port of a liquid chromatography system;
- a carriage configured to move the needle between sample container locations and the injection port of the liquid chromatography system, the carriage including at least one receiving slot and at least one retaining cavity; and
- a housing component including at least one retaining element protruding from the housing component that passes through the at least one receiving slot as the housing component is received within the carriage, wherein a biasing element is disposed within the housing component;
- wherein the housing component is locked into place with the carriage when: (i) the biasing element is compressed in a first direction so that the housing component moves in the first direction with respect to the carriage, and (ii) the housing component is rotated in a second direction until the at least one retaining element is aligned with the at least one retaining cavity of the carriage.

6. The locking needle mechanism of claim 5, wherein the at least one retaining element of the housing component is retained within the at least one retaining cavity of the carriage to lock the housing component into place with the carriage.

7. The locking needle mechanism of claim 6, wherein the biasing element urges the at least one retaining element of housing component into the at least retaining cavity of the carriage.

8. The locking needle mechanism of claim 5, further comprising a base flange disposed around the needle holder, wherein a bottom surface of a flange portion of the base flange contacts a flange of the needle holder, and a top surface of the flange portion of the base flange contacts the biasing element.

9. The locking needle mechanism of claim 5, wherein the carriage includes an opening for receiving the housing component, the biasing element, and the needle holder.

10. The locking needle mechanism of claim 5, wherein the at least one receiving slot is located proximate the at least one retaining cavity.

11. The locking needle mechanism of claim 5, wherein the housing component is depressed to compress the biasing element, forcing the housing component to move in the first direction at least past a thickness of a top surface of the carriage between the at least one receiving slot and the at least one retaining cavity.

12. The locking needle mechanism of claim 5, wherein the housing component includes a neck portion for gripping the housing component to rotate the housing component in the second direction.

13. The locking needle mechanism of claim 5, wherein the locking needle mechanism is configured to detect a contact between the needle a sample container surface.

14. The locking needle mechanism of claim 13, further comprising at least one sensor to detect a movement of the carriage with respect to the needle, when the carriage is locked into place with the housing component.

15. A needle mechanism for detecting a contact between a needle tip and a surface of a sample container, comprising:
- a needle configured to aspirate sample from the sample container and inject the sample into an injection port of a liquid chromatography system, the needle rigidly mounted to a needle holder;
- a carriage configured to move the needle between sample container locations and an injection port of the liquid chromatography system; and
- a housing component locked into place with the carriage, wherein a biasing element is disposed within the housing component;
- wherein the contact between the needle tip and the surface is detected when the carriage moves with respect to the needle as the needle remains stationary.

16. The needle mechanism of claim 15, further comprising a sensor configured to detect a movement of the carriage relative to the needle or needle holder.

17. The needle mechanism of claim 15, wherein the biasing element begins to compress as the needle tip contacts the rigid surface and the carriage continues to move.

18. The needle mechanism of claim 15, wherein, in response to a detecting of the contact, the carriage is configured to reverse direction until the needle contact no longer contacts the surface to maximize sample recovery within the sample container.

* * * * *

UNITED STATES PATENT AND TRADEMARK OFFICE
CERTIFICATE OF CORRECTION

PATENT NO. : 11,162,923 B2
APPLICATION NO. : 16/512559
DATED : November 2, 2021
INVENTOR(S) : David A. Simpson, Joshua A. Burnett and John M. Auclair It is certified that error appears in the above-identified patent and that said Letters Patent is hereby corrected as shown below:

In the Claims

Column 12, Line 64 (Claim 3):
Replace "a" with "the" in the phrase "the needle tip contacts a surface".

Column 13, Line 31 (Claim 7):
Insert the word --one-- at the end of the phrase "the at least".

Column 14, Line 13 (Claim 13):
Insert the word --and-- at the end of the phrase "between the needle".

Column 14, Line 25 (Claim 15):
Replace the word "an" with "the" in the phrase "and an injection port".

Column 14, Line 38 (Claim 17):
Replace the word "the" with "a" in the phrase "the rigid surface".

Signed and Sealed this
Sixteenth Day of August, 2022

Katherine Kelly Vidal
*Director of the United States Patent and Trademark Office*